United States Patent Office

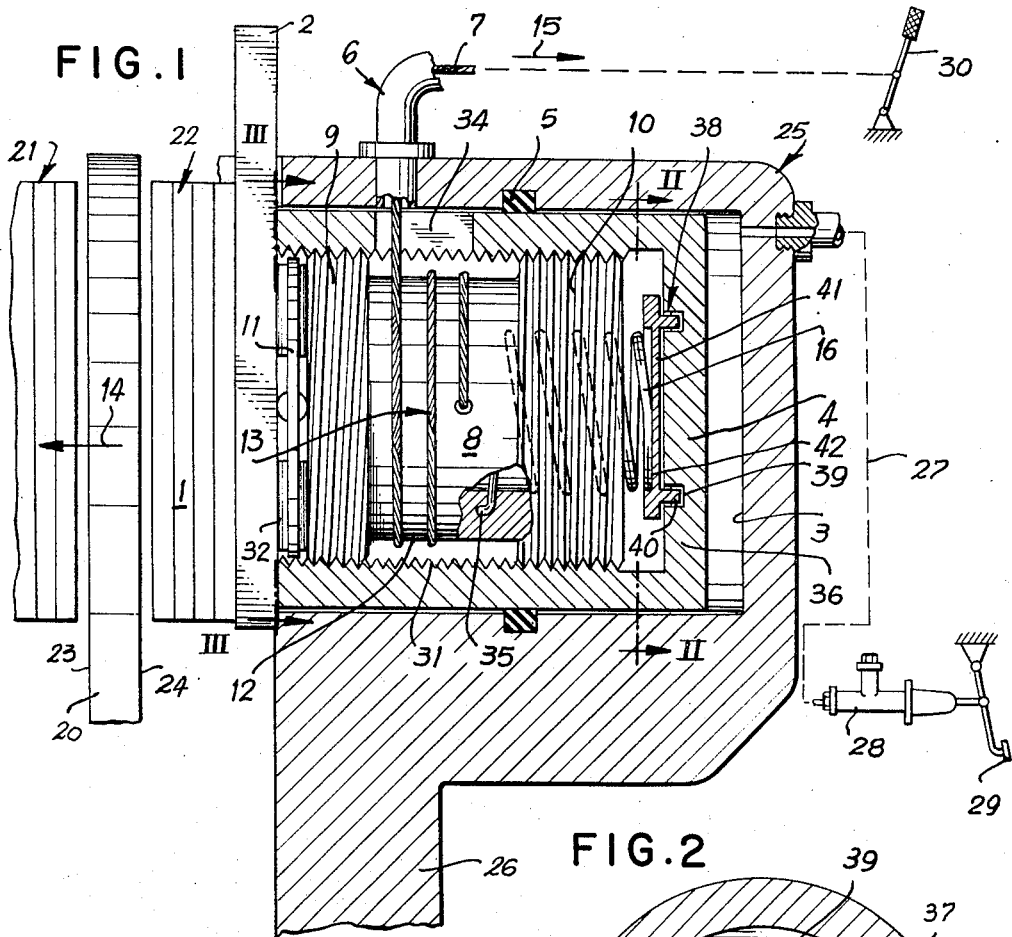
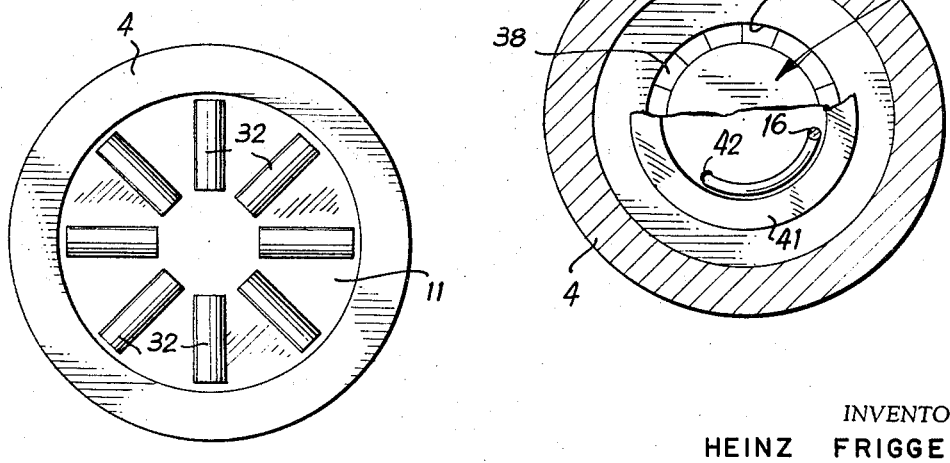

3,425,520
Patented Feb. 4, 1969

3,425,520
DISK-BRAKE ASSEMBLY INCLUDING
PLURAL ACTUATORS
Heinz Frigger, Langen-Oberlinden, Germany, assignor
to Alfred Teves Maschinen- und Armaturenfabrik
KG., Frankfurt am Main, Germany, a corporation of
Germany
Filed June 8, 1967, Ser. No. 644,595
Claims priority, application Germany, June 27, 1966,
T 31,464
U.S. Cl. 188—73       9 Claims
Int. Cl. F16d 55/30, 55/32, 65/14

ABSTRACT OF THE DISCLOSURE

Disk brake wherein a brake-support yoke is disposed aling the periphery of the rotatable disk and an actuating piston is movably mounted on the brake yoke to displace a brakeshoe against the disk; an auxiliary mechanism is provided for advancing the brakeshoe relatively to the disk and includes a spindle threadedly engaging the piston and acting upon or connected with the brakeshoe while being rotatable relatively to the piston to advance the brakeshoe in the direction of the disk. A Bowden line operates the spindle.

---

My present invention relates to a disk-brake assembly having a brake yoke, an actuating piston mounted in the yoke and hydraulically displaceable in the direction of the brake disk to urge a brakeshoe thereagainst; more particularly, this invention relates to a brake assembly of this type having auxiliary means for the self-adjustment of the brakeshoe with respect to the piston to compensate for wear of the brake lining or for the remotely operated advance of the brakeshoe with respect to the piston when the brake is to be employed for emergency-brake, locking-brake and parking-brake purposes.

A conventional disk-brake assembly comprises a brake yoke or support disposed along the periphery of the brake disk which is connected to the axle or wheel of the motor vehicle, while the brake support is more or less fixed to a nonrotatable part of the vehicle such as the chassis or axle housing. In such devices, an actuating member, generally a hydraulically shiftable piston, is axially movable perpendicularly to the annular braking faces of the disk to urge a brakeshoe thereagainst.

A pair of such brakeshoes can be provided in juxtaposition with one another (to balance the axial stress upon the disk) on opposite sides of the disk and may sandwich the latter between them. Thus, when the brake yoke or support is axially movable or "floating," only a single hydraulic cylinder (i.e. wheel-brake cylinder) may be provided since the piston urges one of the brakeshoes against the disk directly while the other brakeshoe is drawn against the disk by the other lobe of the yoke or brake support under the hydraulic reaction force on the wheel-brake cylinder. In a stationary-yoke assembly, a single wheel-brake cylinder can be employed if the brake disk is splined or keyed to its shaft so as to be axially shiftable at least to a limited extent between the brakeshoes, although a pair of such cylinders is provided when both the disk and the yoke are axially fixed.

It has hitherto been the practice to provide such brake devices with a separate set of brakeshoes, serving as the emergency brake, parking brake or locking brake, actuated by a flexible cable (Bowden line), level arrangement or the like from the operator's feet of the vehicle through a hand-operated or pedal-operated level. In alternative arrangements, this auxiliary braking means used brakeshoes of the hydraulic-disk brake although these systems were highly complex, difficult to repair and assemble, and prone to disorder. Furthermore, it has been the practice to provide independently of any auxiliary braking arrangement an automatic self-adjusting means for taking up the brake play and advancing the brakeshoe upon wear of the brake lining. In such devices, a friction system or unidirectional pawl arrangement was provided between the hydraulic piston and cylinder or between the piston and the brakeshoe for unidirectional advance upon increase of the play of the brakeshoe to maintain this play at a predetermined level. Here, too, the systems were unreliable because of their sensitivity to oil and other contaminants, the difficulties involved in assembling and repairing the self-adjusting mechanisms, etc.

It is, therefore, the principal object of the present invention to provide a disk-brake system having a self-adjusting mechanism or an auxiliary remotely operable braking or locking mechanism, or both, of an improved character.

A further object of this invention is to provide a simplified auxiliary mechanism for advancing the brakeshoe relatively to the piston in a disk brake which avoids the disadvantages of earlier systems.

Still another object of this invention is to provide a disk-brake arrangement having a remotely operable auxiliary braking mechanism which is easily mountable and dismountable, can be removed for repair or replacement during normal brake inspections, and which is constituted of relatively simple and easily manufactured parts.

Yet a further object of this invention is to provide an auxiliary mechanism of the character described which is suitable for use both as a remotely operable locking device and a self-adjusting device, while being satisfactory for use with so-called floating-yoke brakes, fixed-yoke brakes, and even oscillatory-yoke brakes.

These objects and others which will become apparent hereinafter are attained, in accordance with the present invention, by providing a disk-brake assembly having a brake-support member disposed along the periphery of the disk; a piston member mounted in the brake-support member and a brakeshoe member urged by the piston member against the brake disk by normal hydraulic actuation of the brake. The auxiliary mechanism for advancing the brakeshoe relative to the other members in this case includes a spindle threadedly received in one of the members and bearing axially upon the other of the members, while actuating means is provided for advancing the spindle to shift the brakeshoe member and eliminate excessive play (when the device is a self-adjusting mechanism) or to lock the brakeshoe member against the corresponding annular braking face of the disk when the mechanism is remotely operable, e.g. via a Bowden cable or other tensionable element.

According to a further feature of this invention, the threaded spindle is received in the piston member of the brake and is provided as a windlass or drum about which a flexible cable is wound peripherally so that tensioning of this cable rotates the spindle relatively to the piston and advances the spindle to urge the brakeshoe against the disk. Thus, the spindle is a remotely operated actuating member and part of the brake-locking system, the flexible cable forming part of a Bowden line which may extend to the region of the driver's seat of the vehicle and is there tensioned by a foot-operated lever (e.g. a pedal) or a manually actuatable (handbrake) lever. Preferably, anti-friction thrust-bearing means is provided between the spindle and the confronting surface of the backing plate of the brakeshoe, the thrust-bearing means being constituted as a flat disk having a plurality of roller elements rotatable therein and angularly spaced about the axis of this disk and the axis of the piston. The roller elements may be conventional ball, roller or needle bearings.

Still another feature of this invention resides in the provision of a spring means between the spindle and the piston and connected thereto so as to resiliently urge the spindle in the opposite rotational sense when it is imparted by the flexible actuating element wound therearound, thereby forming a restoring means which, upon release of the tension of the flexible element, rotates the spindle to release the locking force. I have found that this mechanism can simultaneously serve as a self-adjusting means for the wear of the brakeshoe lining when the reverse rotation of the spindle is limited to a predetermined degree. To this end, I provide between the spindle and the piston a ratchet arrangement cooperating with the spring and steppable upon the application of a torque thereto by the flexible element beyond a predetermined angular movement whereby the spring is effective to return the spindle in the restoring direction only through a fraction of the original angular movement. Consequently, when the plate of the brakeshoe exceeds a predetermined extent corresponding to the maximum angular displacement prior to stepping of the ratchet, the further rotational movement of the spindle will advance the ratchet and establish a new starting position of the spindle in which the brakeshoe is disposed closer to the disk than theretofore. In place of the ratchet, other unidirectionally effective clutch means can be provided between an end of the spring and the respective surface of the spindle or piston with which it co-operates.

The above and other objects, features and advantages of this invention will become more readily apparent from the following description, reference being made to the accompanying drawing in which:

FIG. 1 is a diagrammatic axial cross-sectional view of one-half of a disk brake embodying the present invention;

FIG. 2 is a cross-sectional view taken generally along the line II—II of FIG. 1; and FIG. 3 is an end view of the piston showing the antifriction means thereof and taken generally along the line III—III of FIG. 1.

In the drawing, I show a disk-brake arrangement in which the brake disk 20 is connected to an axle or wheel of a motor vehicle in the usual manner and is flanked by a pair of brakeshoes 21 and 22 in mutual juxtaposition for engagement with the respective braking faces 23 and 24 of the disk. A yoke 25 extends about the periphery of the disk as illustrated and described in my aforementioned copending application, although only one-half of this yoke is illustrated here. The yoke can be affixed at 26 to a relatively stationary portion of the vehicle, e.g. the axle housing, and can be a fixed yoke, a floating yoke or a swinging yoke as described generally above. Each lobe or half of the yoke can be provided with actuating means of the character described hereinafter and a respective hydraulic cylinder, or merely a brakeshoe which is applied against the disk when the single wheel-brake cylinder of the arrangement is hydraulically pressurized.

In the brake yoke 25, there is provided a wheel-brake cylinder 3 which receives hydraulic fluid via a line 27 from a master cylinder 28 whose brake pedal 29 can be depressed by the driver as is customary in hydraulic-brake systems. In the region of the driver's seat of the vehicle there is also provided a control member such as a manually operable lever or a pedal which is represented diagrammatically at 30 and serves to operate the emergency brake or locking brake as described below.

For the normal hydraulic operation of the brake, the cylinder 3 receives a piston 4 which bears axially upon the brakeshoe 22 in the direction of arrow 14, i.e. along the axis of the piston 4 and parallel to the axis of rotation of the disk 20 or perpendicular to its braking faces 23, 24. A seal 5 is received within the lobe of the cylinder 3 and slidably engages the piston 4 to prevent escape of fluid from the cylinder. The piston 4 is hollow and provided with an internal thread 31 engaging the complementary external thread of a spindle 8 adapted to apply the braking force to the backing plate 2 of the brakeshoe 22. The backing plate 2 is bonded to a brake lining 1 confronting the braking face 24 of the disk 20 in the usual manner. Between the face of the spindle 8 and the backing plate 2, I provide an antifriction thrust bearing 11 which is constituted as a disk in which the needle-bearing roller elements 32 are angularly spaced and held as a bearing cage. While needle bearings have been shown here for convenience, it will be understood that ball or roller bearings may be used with excellent effect.

The spindle 8 is subdivided axially into a pair of threaded bosses 9 and 10 and formed between them with a peripheral recess or reduced-diameter portion 12 forming the windlass drum. A flexible element, e.g. the core wire of a Bowden cable, is wound about the reduced-diameter portion 12 through a plurality of turns as represented at 13 and is led through an axially extending slot 34 in the wall of piston 4. The sheath 6 of the Bowden cable is affixed to the brake support 25 and is represented as having its core wire 7, which is attached to the turns 13 or is an extension thereof, connected to the lever 30. A restoring spring 16, whose left-hand end is secured to the spindle 8 at 35 and which is partly received in this spindle, bears at its right-hand end against the transverse wall 36 of the piston 4 while forming a unidirectional clutch means thereto. In this embodiment, the unidirectional clutch is represented at 38 and comprises an annular array of ratchet teeth 38 formed at the base of an annular recess 39 in the wall 36 of the piston, a circular ridge with complementary teeth being provided at 40 in engagement with the teeth 38 and being carried by a disk 41 to which the spring 16 is attached at 42. The spring 16 is an axial compression spring but here serves also as a torque or torsion spring whose purpose is described hereinafter. Self-rotation of the spindle 8 upon the application of axial force thereto is prevented by the spring 16 and the self-locking nature of the threaded connection between the spindle and the piston.

For the usual operations of the brake, the rotation of the disk 20 relative to the housing 25 can be terminated by the vehicle operator when he steps upon the pedal 29 and forces brake fluid from the motor cylinder 28 through the line 27 into the wheel-brake cylinder 3. Hydraulic pressure is thus applied to the piston 4 in the direction of arrow 14 and this piston is advanced to the left to bring the brake lining 1 into engagement with the respective braking face 24 of the disk. During such operations, the brake lining 1 may be partly abraded so that the brake play, i.e. the stroke of the brakeshoe 22, prior to its contact with the disk, increases with repeated use of the brake. When the emergency braking or locking brake is to be applied, the Bowden cable 6, 7 is tensioned by lever 13 as represented by arrow 15 and the flexible element 13 is drawn from the reduced-diameter portion of the spindle 8 in a tangential direction, thereby rotating the spindle 8 to advance tthe latter with respect to the piston 4. This axial advance of the spindle urges the brakeshoe 22 against the disk 20 to perform a locking action. Reverse axial movement of the piston 4 is prevented by the incompressible fluid in cylinder 3. Release of the lever 30 permits the spring 16, which has been partly twisted by the rotation of the spindle, to rotate the spindle in the opposite sense and block it off the shoe 22. When the brakeshoe wear is such that the play has increased beyond a predetermined level, the torque applied to the spring 16, upon axial advance of the spindle 8 during operation of the emergency, braking or locking brake, is sufficient to step the right-hand end of the spring angularly through one or more teeth of the ratchet assembly 37. The restoring stroke of the spring 16 is correspondingly reduced and, when the Bowden line is released, the spindle 8 is returned angularly only through a fraction of its angular advance to establish a new rest position for the brakeshoe 22 in which the face of lining 1 is positioned at or below the predetermined play with respect to the disk 20. When the piston 4 is provided with a conventional self-adjusting device, the unidirectional clutch means 37 can be eliminated and the system used solely for remotely controlling the application of the locking brake. The thrust bearing 11 substantially reduces friction during the rotation of the spindle 8 when the hand-brake is actuated.

The invention described and illustrated is believed to admit of many modifications within the ability of persons skilled in the art.

I claim:

1. A disk-brake assembly comprising: a rotatable brake disk; a brake-support member disposed along the periphery of said disk; an actuating member movably mounted on said brake-support member and operable to effect braking action: a brakeshoe movably mounted on said brake-support member and shiftable by said actuating member against said disk, an auxiliary mechanism for advancing said brakeshoe relatively to said disk, said auxiliary mechanism including a spindle threadedly engaging one of said members and acting upon said brakeshoe while being rotatable to advance said brakeshoe in the direction of said disk, and means for rotating said spindle, said actuating member being a piston and said brake-support member including a fluid-operated cylinder slidably receiving said piston, said spindle being threadedly received in said piston; and a flexible element wound upon said spindle, and means for applying a tractive force to said flexible element for rotating said spindle relatively to said piston.

2. The disk brake defined in claim 1, further comprising thrust-bearing means between said brakeshoe and said spindle for reducing frictional interaction between said brakeshoe and said spindle upon rotation of said spindle.

3. The disk brake defined in claim 1 wherein the last-mentioned means is a Bowden line operable from a location remote from said support member.

4. The disk brake defined in claim 3, further comprising a torsion spring coupling said spindle and said piston and resiliently resisting rotation of said spindle by said flexible element to rotate said spindle in an opposite sense upon release of the tractive force upon said element.

5. The disk brake defined in claim 4 wherein said spring is a coil spring at least partly received in said spindle.

6. The disk brake defined in claim 4, further comprising unidirectional clutch means between said spring and at least one of said spindle and said piston and effective to advance the starting position of said spindle to compensate for wear of the brakeshoe.

7. The disk brake as defined in claim 6 wherein said unidirectional clutch means is a ratchet.

8. A disk-brake assembly comprising: a rotatable brake disk; a brake-support member disposed along the periphery of said disk; an actuating member movably mounted on said brake-support member and operable to effect braking action; a brakeshoe movably mounted on said brake-support member and shiftable by said actuating member against said disk; and an auxiliary mechanism for advancing said brakeshoe relatively to said disk, said auxiliary mechanism including a spindle threadedly engaging one of said members and acting upon said brakeshoe while being rotatable to advance said brakeshoe in the direction of said disk, and means for rotating said spindle, including a Bowden line having a flexible tensionable element wound about said spindle, torsion spring means between said spindle and said one of said members for resiliently resisting displacement of said spindle by said Bowden line, and unidirectional clutch means connected with said spring means for advancing said spindle to compensate for wear of said brakeshoe.

9. A disk-brake assembly comprising: a rotatable brake disk; a brake-support member disposed along the periphery of said disk; an actuating member movably mounted on said brake-support member and operable to effect braking action; a brakeshoe movably mounted on said brake-support member and shiftable by said actuating member against said disk; and an auxiliary mechanism for advancing said brakeshoe relatively to said disk, said auxiliary mechanism including a spindle threadedly engaging one of said members and acting upon said brakeshoe while being rotatable to advance said brakeshoe in the direction of said disk, and a tensionable cable wrapped around said spindle for rotating same.

References Cited

UNITED STATES PATENTS

| 3,269,490 | 8/1966 | Swift | 188—72 X |
| 3,331,472 | 7/1967 | Swift | 188—196 X |
| 3,357,522 | 12/1967 | Bradley et al. | 188—73 |

FOREIGN PATENTS

| 717,350 | 10/1954 | Great Britain. |
| 799,577 | 8/1958 | Great Britain. |

GEORGE E. A. HALVOSA, *Primary Examiner.*

U.S. Cl. X.R.

188—106